INVENTOR.
Hans Barth,
BY John B. Brady
ATTORNEY

United States Patent Office 2,720,153
Patented Oct. 11, 1955

2,720,153

APPARATUS FOR STERILIZING THE SHELLS OF EGGS WITHOUT DETRIMENTAL EFFECTS TO THE INTERIOR OF THE EGGS

Hans Barth, Belmont, Calif., assignor to American Institute of Radiation, Belmont, Calif., a corporation of California Application July 7, 1950, Serial No. 172,532

4 Claims. (Cl. 99—249)

My invention relates broadly to a method and apparatus for sterilizing the shells of eggs without detrimental effects to the interior of the eggs and more particularly to a production line method and apparatus for inexpensively treating eggs for preservation of the eggs over long periods of time without refrigeration.

One of the objects of my invention is to provide an improved method for sterilizing the shells of eggs by the application of a heat flash of high temperature applied uniformly over the whole external surface of the shells of the eggs for sterilizing the shells in a preserving process.

Still another object of my invention is to provide a method of preserving eggs which involves the application of intensive heat over the entire exterior surface of the shells of the eggs while the eggs are being revolved for sterilizing the shells prior to an oil dipping process for maintaining the eggs in good edible condition over long periods of time without resorting to refrigeration.

Still another object of my invention is to provide a method for treating the shells of eggs by rotation of the eggs while applying a flow of intense heat over the surfaces of the shells of the eggs for a time period of the order of one to three seconds for sterilizing the shells of the eggs preparatory to a preservative surface treatment for maintaining the eggs fresh over an extended period of time without resorting to refrigeration.

Still another object of my invention is to provide an apparatus for treating the shells of eggs in which production line methods may be applied in the treatment of eggs prior to packaging by individually loading the eggs in a production line path while subjecting the eggs individually to a stream of hot gases for a time period sufficient to adequately sterilize the surfaces of the eggs but without detrimental effects upon the interior of the eggs preparatory to a dipping application for insuring the preservation of the eggs over a substantial time period without resorting to refrigeration.

Figure 1:
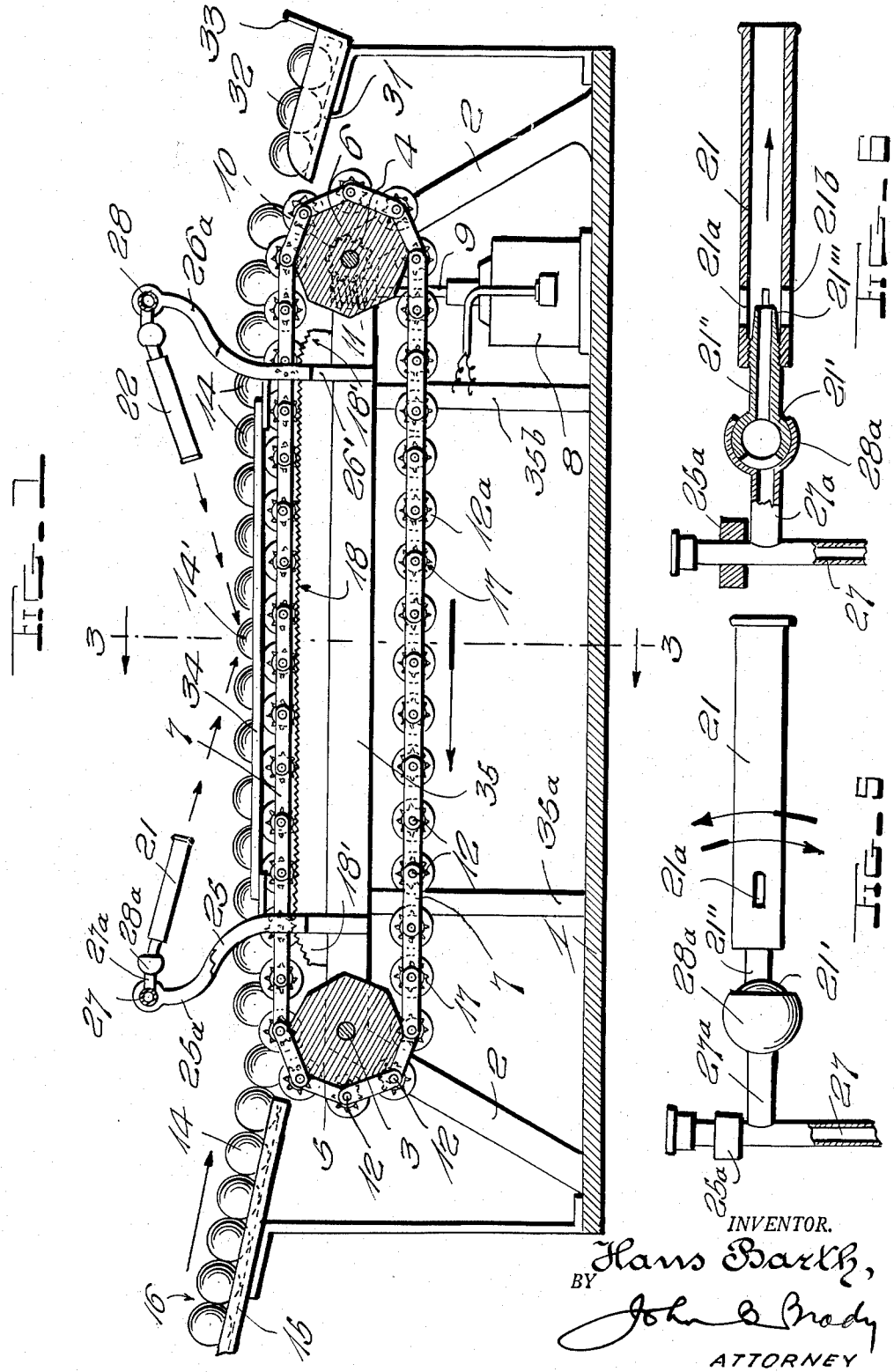
Figure 2:
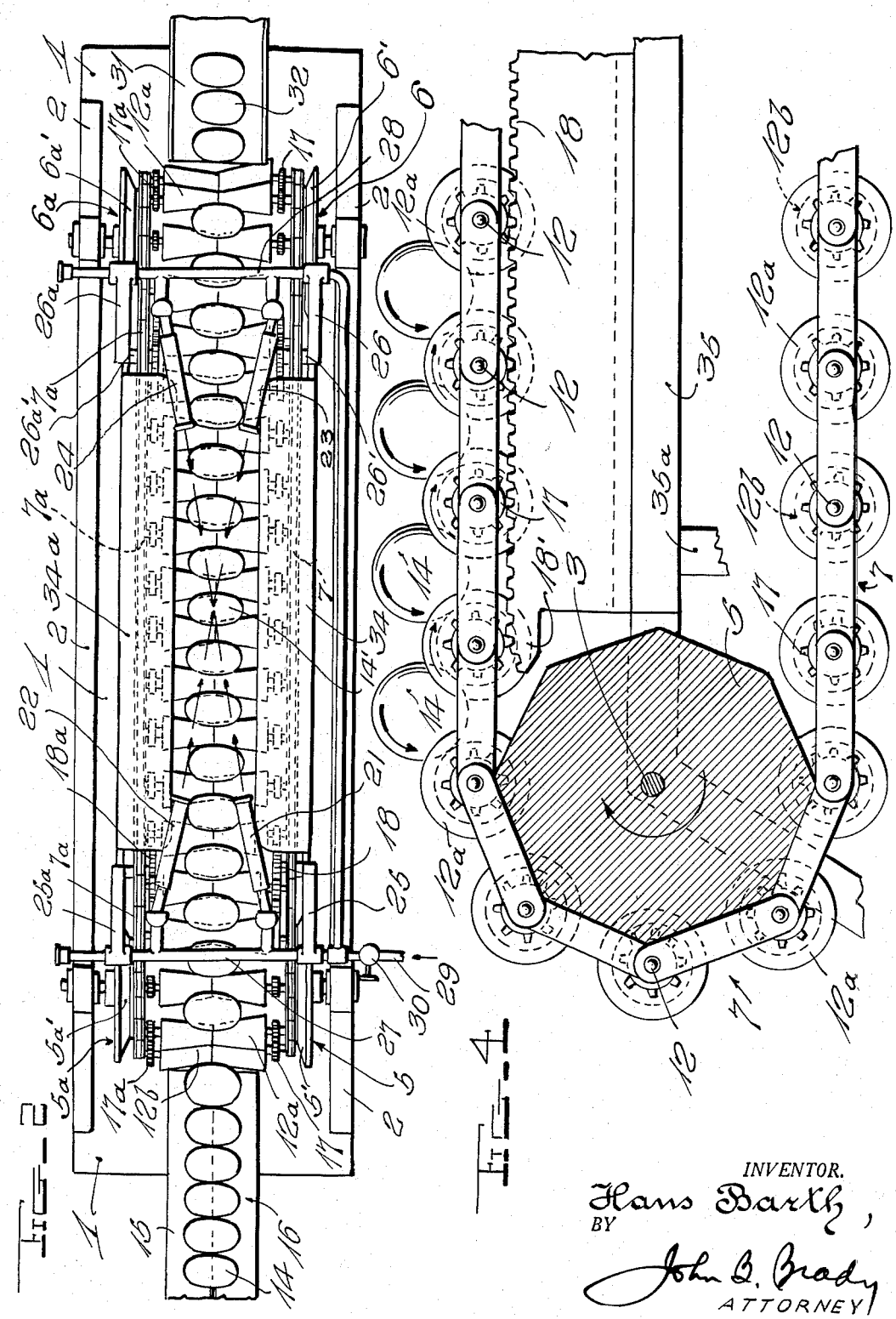
Figure 3:
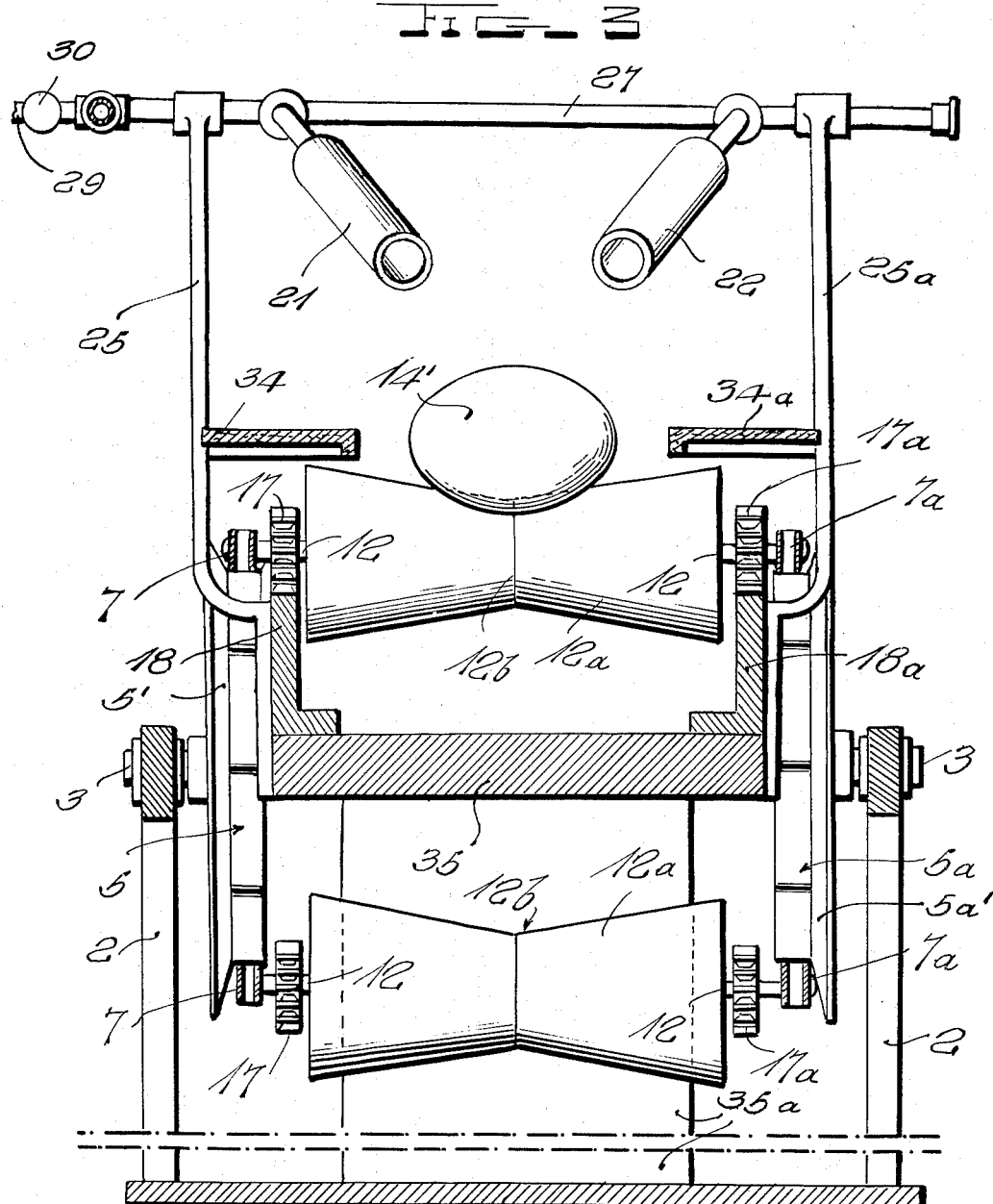
Figure 7:
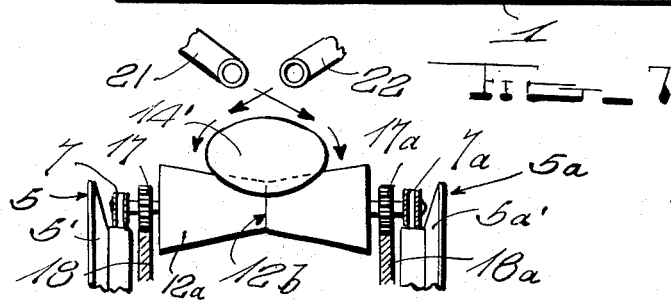

Other and further objects of my invention reside in the improved method and apparatus for sterilizing the shells of eggs without detrimental effects to the interior of the eggs as set forth more fully in the specification hereinafter following by reference to the accompanying drawings in which:

Figure 1 is a side elevational view of one form of apparatus for carrying out the process of my invention and showing the eggs passing through the apparatus of my invention for treatment preparatory to a subsequent dipping process; Fig. 2 is a top plan view of the apparatus illustrated in Fig. 1; Fig. 3 is an enlarged vertical sectional view taken through the apparatus of Figs. 1 and 2 substantially on lines 3—3 thereof; Fig. 4 is an enlarged fragmentary sectional view showing an end portion of the conveyor mechanism and illustrating particularly the mechanism for revolving the eggs for subjecting the shells of the eggs to a forced flow of intensive heat over a limited time for sterilizing the shells of the eggs; Fig. 5 is a top plan view of one of the adjustable heat directing nozzles used in carrying out the method of my invention; Fig. 6 is a fragmentary longitudinal sectional view through the heat directing nozzle shown in Fig. 5; and Fig. 7 is a theoretical view illustrating the manner of force flowing the heat over the entire surfaces of the shells of the eggs as the eggs are revolved during the treatment process.

The deterioration of egg quality during marketing still presents a serious problem to producers, shipping companies and buyers. According to a study, published by the U. S. Department of Agriculture in 1949, practically all eggs are high-quality table eggs when the hens lay them but approximately one out of every three eggs has dropped below Grade A in quality by the time farmers sell them to the first receivers, and approximately more than two out of five are below Grade A after a lapse of two days during the marketing journey that may often last two or three weeks.

Much effort has therefore been directed to the prevention of the rapid deterioration in quality of fresh eggs. It is known that bacteria, penetrating through the shell into the interior of the egg, accounts primarily for the destruction of the egg during storage. The routine procedure conventionally applied to protect the eggs from germ infection is that of coating the eggs with a thin layer of mineral oil, which to some degree prevents bacteria from entering the pores of the egg shell. However, egg grading companies and carload lot assemblers, applying this method, are generally dissatisfied with its low efficiency. Usually the eggs are dipped into oil when they reach the grading and packing plants. Their shells are covered outside with bacteria making it impossible to keep oil bath sterile. Germs have penetrated to the inside of the egg even before the protective coating is applied. The oil coating does not sterilize the outer shell and additional germs penetrate the pores along with the oil, as the treated egg "breathes" during storage. For such reasons there is a need for improved protective procedure to provide complete protection to the egg at the earliest possible stage after being laid. At the same time, the treating method and apparatus must be such that it can be incorporated efficiently into the normal procedure of handling, grading, or packing of eggs.

The new procedure and apparatus of my invention to meet the requirements hereinbefore set forth has been successfully operated and most satisfactory results produced.

The method I have devised sterilizes the shell of an egg by applying heat to the outside of the shell for a time period which is too short to permit penetration of heat to the interior of the eggs in amounts harmful to the interior of the egg. The sterilizing apparatus of my invention operates on the principle of applying a well defined and accurately timed heat flash of high temperature uniformly to the whole external surface of the shell of the egg.

Referring to the drawings in more detail reference character 1 designates base structure on which the frame 2 of the treatment apparatus is erected. The frame 2 extends in a longitudinal direction along base support 1 and provides journalling means adjacent opposite ends thereof for rotatable shafts 3 and 4. Rotatable shafts 3 and 4 each carry sets of spaced discs 5, 5a, 6 and 6a which are provided with inwardly directed octagonally shaped flanges. The octagonally shaped flanges of the sets of discs 5, 5a and 6, 6a each terminate in circular ends connected through inclined faces 5', 5a' and 6', 6a'. The two link chains 7 and 7a engage over the octagonally shaped flanges 5, 5a and 6, 6a and extend longitudinally of the apparatus. These link chains consist of individual links pivotally connected end to end and each having a length which corresponds to the width of each of the octagonal faces on flanges 5, 5a and 6, 6a whereby rotation of the end discs serve to advance the endless chain conveyor step by step by increments corresponding to the length of the links 7—7a constituting the endless conveyors.

The endless conveyor is driven from a motor 8 mounted adjacent one end of the frame 2 and connected through shaft 9 which carries wormwheel 11 for driving the endless conveyor. Wormwheel 11 meshes with pinion 10 carried by transverse shaft 4 for driving shaft 4 for effecting step by step advancement of the endless conveyor as the links 7 and 7a thereof are moved by the octagonally shaped faces on flanges 5, 5a and 6, 6a on the sets of discs carried by transverse shafts 3 and 4.

The links 7 and 7a are pivotally connected end to end and at their pivotally connected positions serve as journals for the multiplicity of transverse shafts 12 which carry the revolvable roller members indicated at 12a. These roller members 12a are shaped to provide a central shallow V-shaped pocket represented at 12b and are so spaced from each other on centers provided by links 7 and 7a that adjacent rollers coact to receive and support individual eggs therebetween as represented at 14 while establishing substantially tangential contact with the surfaces of the shells of the eggs. By reason of this spacing and because of the shapes of the individual roller members 12a there is a minimum of contact between the roller members 12a and the surfaces of the shells of the eggs enabling the hot flame which will be hereinafter described in more detail to pass wholly around the surfaces of the shells of the eggs for uniformly treating the surfaces. The rollers 12a are formed from fireproof heat resisting material such as a ceramic. Accordingly the surfaces of the shells of the eggs are not subjected to a continuous heat treatment which would be the case should heat accumulate and be absorbed and stored in the roller members 12a of the endless conveyor for on the contrary heat is dissipated from the shells of the eggs immediately after the heat flash treatment hereinafter described.

The eggs are delivered to the apparatus of my invention by gravitation down a positioning chute 15 as represented at 16 where the individual eggs roll to a position between roller members 12a and seat within the central shallow V-shaped recesses 12b therebetween. The transverse shafts 12 extend transversely between the pivotally connected links 7 and 7a in which opposite ends of the transverse shafts are journalled. Intermediate the enlarged ends of roller members 12a and the pivotally connected links 7 and 7a and adjacent opposite ends of the roller members 12a I provide pinions 17 and 17a which are engageable throughout their path of travel on the upper level with the teeth of longitudinally extending racks 18 and 18a. The racks 18 and 18a are formed on brackets extending from the horizontally extending bed-plate 35 supported on legs 35a and 35b extending from base structure 1. The racks 18 and 18a taper downwardly at the opposite ends thereof as represented at 18' in Figs. 1 and 4, so that the pinions 17 and 17a are disengaged with the racks 18 and 18a for the entire path of travel of the conveyor except for that time interval during which the eggs are progressively advancing toward the heat treatment station, passing through the heat treatment station, and moving away from the heat treatment station.

The heat treatment station in the apparatus of my invention is located at the apex position upon which the four adjustable gas projecting jets 21, 22, 23 and 24 converge. The gas projecting jets 21, 22, 23 and 24 are adjustedly supported in pairs from positions adjacent opposite ends of the conveyor on standards represented at 25 and 25a and 26 and 26a fastened through legs represented for example at 26 and 26' with the sides of the racks 18 and 18a and bed-plate 35 as shown more particularly in Fig. 3. The standards 25 and 25a and 26 and 26a also support gas supply pipes 27 and 28 which are mutually interconnected and operated from a main gas supply 29 through valve 30.

In Figs. 5 and 6 I have shown the construction of the adjustable nozzles in more detail. The gas supply pipe 27 is connected through the extension pipe 27a with a partially spherical distribution head 28a forming a socket for a coacting partially spherical head 21'. The head 21' has an extension pipe 21'' projecting therefrom terminating in a nozzle 21'''. The external terminus of nozzle 21''' is screw threaded to receive the adjustable sleeve of nozzle 21. The adjustable sleeve of nozzle 21 is apertured at 21a and 21b for the intake of air for facilitating combustion in the burner. The ignited flames issuing from nozzle 21 may be directed with accuracy upon the surface of the center egg represented at 14'. All of the adjustable nozzles 21, 22, 23 and 24 are similarly directed upon the center egg 14' which is revolving under control of the positively driven roller members 12a. As represented more particularly in Fig. 7 the entire surface of the egg is bathed in flame subjecting each egg to intensive heat. The time interval during which the egg is subjected to intensive heat is regulated by the speed of the conveyor and the size of the flames issuing from nozzles 21, 22, 23 and 24. Under proper working conditions, I have found that this time period ranges from one to three seconds. The circumferences of the roller members 12a and the diameters of the pinions 17 and 17a determine the speed of rotation of the eggs and are so designed that the eggs pass through at least one full revolution during the time the egg is exposed to the flames.

After passing through the flash flame treatment the eggs continue to advance to the end of the conveyor while being revolved for effecting rapid cooling thereof and are then discharged from the end of the conveyor down the discharge chute 31 in the position illustrated at 32. At the discharge position the eggs may be collected in a pan or basket schematically represented at 33 from which the eggs are passed to a presterilized oil bath. The oil bath is kept practically sterile because contamination through infected egg shells is eliminated.

Protection to the parts of the moving conveyor against the intense heat of the flame through which the eggs move is afforded by the asbestos or other heat resistant aprons or shields represented at 34 and 34a supported from the standards 25, 25a, 26 and 26a.

As represented in Fig. 4 the eggs 14 are revolved by frictional contact with the roller members 12a, the adjacent roller members coacting to rotate the eggs in a counter-clockwise direction as the top level portion of the conveyor moves toward the right in advancing the eggs from the pick up chute 15 to the discharge chute 31.

The temperature over the surface of the egg for a period of from one to three seconds is of the order of between 700 and 800 degrees centigrade.

I have found the heat flash treatment for eggs so effective that the freshness of the eggs is preserved over a period of several weeks under conditions which destroys untreated eggs. I have checked the results of the method of my invention by use of untreated control eggs alongside of the treated eggs and know that the treated eggs possess the quality of freshness not possessed by the control eggs. Prior to the special tests both the control eggs and treated eggs were tested and checked for uniformity of condition so that the excellent results obtainable with the method and apparatus of my invention are directly attributable entirely to the flash heat treatment provided by my invention.

While I have referred to the application of heat by gas discharge flames I desire that it be understood that intense heat may be applied by use of a stream of hot air or by employment of an electric heater. The important requirement of the method of my invention is that the eggs be subjected to the intensive heat treatment during the first acts of handling at the producers location and preferably immediately after the eggs are laid. The principle of my invention resides in sterilization of the egg shell with a flash of intensive heat applied uniformly over the egg shell for a short time interval, the time being so short that no harmful amount of heat can penetrate into the interior of the eggs.

While I have described my invention in certain of its preferred embodiments, I realize that changes in structure and details of the process may be made and I desire that it be understood that no limitations upon my invention are intended other than those which may be imposed by the scope of the appended claims.

What I claim as new and desire to secure by Letters Patent of the United States is as follows:

1. An apparatus for sterilizing the shells of eggs without detrimental effects to the interior of the eggs comprising a conveyor for advancing the eggs in a linear path from a collection position to a delivery position, said conveyor including a multiplicity of spaced roller members having recessed pockets therebetween for receiving the eggs and advancing the eggs in a linear path, means for individually revolving each of said roller members and correspondingly revolving the eggs seated therebetween while advancing the eggs in a linear path, a gas supply, a pair of vertically disposed standards erected adjacent one end of said conveyor, a pair of symmetrically arranged nozzles supported by said vertically disposed standards for directing beams constituting gaseous ignited blasts from said gas supply at high temperature over the surface of each egg at a selected location in the linear path of travel thereof and while the egg is being revolved, said beam striking said egg for a time interval so short that no harmful amount of heat can penetrate into the interior of the egg, said beams extending above the eggs on either side of the selected location in which said beams strike the surface of the egg at said selected location, and means for discharging the eggs from the conveyor at a discharge position.

2. An apparatus for sterilizing the shells of eggs without detrimental effects to the interior of the eggs as set forth in claim 1, in which a second pair of vertically disposed standards is erected adjacent the delivery position of said conveyor and wherein a second pair of symmetrically arranged nozzles, connected with said gaseous supply, is supported in said second pair of vertically disposed standards for directing additional beams constituting gaseous ignited blasts from said gas supply at high temperature over the surface of the same egg, at the selected location, which is treated by said first mentioned beams, said second mentioned beams extending above the eggs on either side of the selected location in which said beams strike the surface of the egg at said selected location.

3. An apparatus for sterilizing the shells of eggs without detrimental effects to the interior of the eggs as set forth in claim 1, in which a pair of heat resistant lineally extending shields are arranged over said conveyor on opposite sides of the recessed pockets in said spaced roller members for substantially protecting said roller members from the direct effects of heat incidental to said directed beams constituted by the gaseous ignited blasts at high temperature which contacts the surface of each egg in said selected location.

4. An apparatus for sterilizing the shells of eggs without detrimental effects to the interior of the eggs which comprises a frame structure, a horizontally extending conveyor supported on said frame structure, said conveyor including a multiplicity of spaced roller members having recessed pockets therebetween for receiving eggs from a collecting position adjacent one end of the conveyor to a discharge position adjacent the other end of the conveyor, means for advancing said conveyor, a pair of standards supported on said frame structure adjacent the collection end of said conveyor, another pair of standards supported by said frame structure adjacent the discharge position of said conveyor, a gas supply, a gas distribution pipe extending laterally of each of said pairs of standards, a gas distribution pipe interconnecting said laterally extending gas distribution pipes, a pair of nozzles connected at spaced positions along each of said pair of gas distribution pipes and directed toward the center position of said conveyor for blasting each egg as the egg reaches a central position along said conveyor with an ignited blast of gas at high temperature but for a time interval so short that no harmful amount of heat can penetrate into the interior of the egg.

References Cited in the file of this patent

UNITED STATES PATENTS

| | | |
|---|---|---|
| 1,157,017 | Lowe | Oct. 19, 1915 |
| 1,528,885 | Mather | Mar. 10, 1925 |
| 1,647,872 | Leavitt | Nov. 1, 1927 |
| 1,660,061 | Addison | Feb. 21, 1928 |
| 1,691,874 | White | Nov. 13, 1928 |
| 1,738,958 | Mulvany et al. | Dec. 10, 1929 |
| 1,902,244 | King | Mar. 21, 1933 |
| 2,403,923 | Hemmeter | July 16, 1946 |
| 2,423,233 | Funk | July 1, 1947 |
| 2,497,817 | Hale et al. | Feb. 14, 1950 |
| 2,523,080 | Webb | Sept. 19, 1950 |
| 2,624,982 | Vander Wal | Jan. 13, 1953 |